April 19, 1932.   C. F. BINDER   1,854,328
BATTERY POST EXTENSION
Filed March 12, 1930
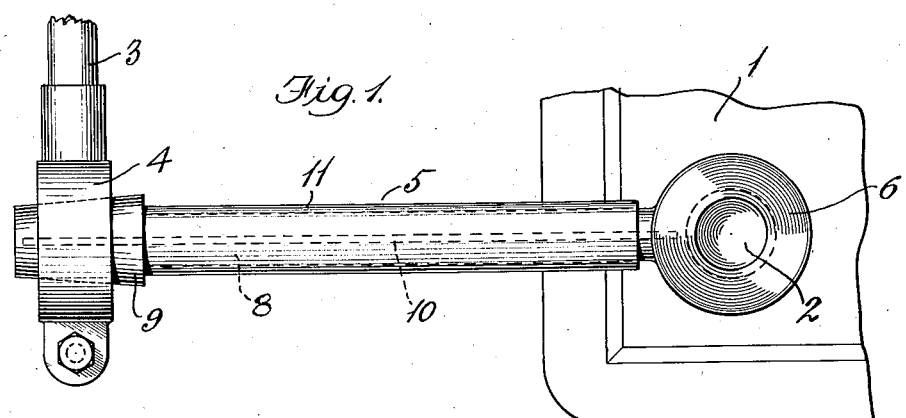
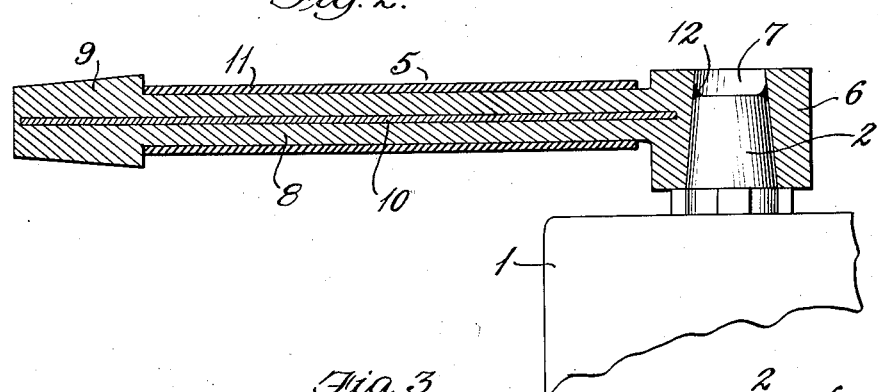
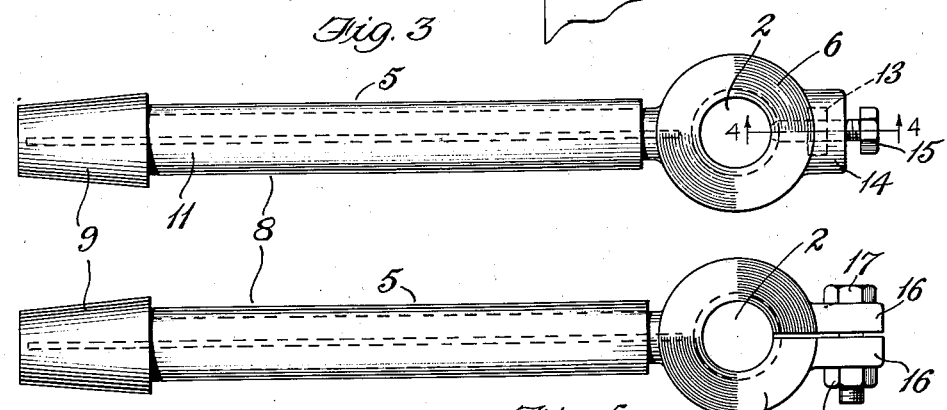
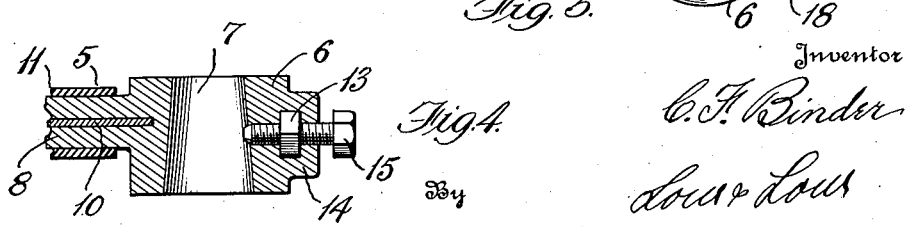
Inventor
C. F. Binder
By Louis & Louis
Attorneys Patented Apr. 19, 1932

1,854,328

UNITED STATES PATENT OFFICE

CHARLES FREDRICK BINDER, OF ATLANTA, GEORGIA

BATTERY POST EXTENSION

Application filed March 12, 1930. Serial No. 435,175.

The present invention relates to storage batteries such as automobile, radio and similar batteries, and has for its objects to provide an extension arm or attachment for one or both of the battery terminal posts whereby sulphate deposits and corrosion of the terminals due to acid vapors is effectually prevented.

The described corrosion of the battery terminal posts usually occurs principally at the positive pole, and is a result of sulphuric or other acid vapors originating within the battery cells. The described acid vapors emanating from the cells have a chemical reaction with the usual current conducting battery connections commonly formed of iron, brass and copper, with consequent deterioration of the life of the battery. Sulphate deposits are formed at the connections which seriously impair the entire electric system, including starting, lighting and generating, when the battery is employed in an automobile.

The above described objectionable corrosion and sulphate deposits are entirely obviated by my invention, and for this purpose I have provided a unitary extension arm formed of an alloy of acid-resisting material, the use of which will not be attended by any sulphate deposits resulting from the presence of acid vapors. The extension arm of alloy metal is designed for attachment at one end of the battery post and at its other end to the usual flexible cable conductor which may be grounded or extend to the starting motor. In the absence of my invention the free end of the cable is ordinarily secured directly to the battery post. By the invention the connection at the cable terminal is spaced from the battery and a substantial distance from the area of acid fumes which might otherwise have a deteriorating effect on the cable connection.

A further object of the invention is to provide an extension arm of the character described which is of a flexible and ductile nature and may be readily distorted as desired to facilitate its connection between the described battery and cable terminals. In addition to being acid resistant and not susceptible to corrosion, the improved extension arm is constructed to afford unobstructed passage of the electric current through the arm between the respective terminal connections.

The attachment is simple in its nature and may be conveniently secured in place without the use of special tools and may be manufactured economically and to commercial advantage. The invention also acts as a cushion or shock absorber in service, both with respect to electric current surges and in preventing undue vibration and swaying of the battery plates, thereby conserving and prolonging the life of the battery.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration.

In said drawings:

Fig. 1 is a plan view of an improved battery post extension member illustrated as removably secured or attached at its respective ends to one of the battery terminal posts and to the usual electrical conductor or cable.

Fig. 2 is a side view of the same, the extension member being shown in vertical section to illustrate more clearly the nature of its construction, and the cable connection being omitted.

Fig. 3 is a view similar to Fig. 1 showing a modified manner of attaching one end of the extension member to the battery post or terminal.

Fig. 4 is an enlarged vertical section on line 4—4 of Fig. 3.

Fig. 5 is a view similar to Fig. 3 illustrating a further modified form of attachment of the arm to the battery post.

Referring to the drawings:

The battery, which is usually of the storage type, is indicated at 1, and 2 represents one of the terminal posts. The electrical conductor or cable connection is shown at 3 (Fig. 1) and in the absence of the present improvements the connector 4 of the cable is suitably secured to the post 2.

The battery post extension member or arm constituting the present invention is indicated generally at 5 and comprises a hub portion 6 provided with a vertically disposed preferably tapered aperture 7 adapted for snug engagement with the end of the terminal post 2. The extension member further comprises an intermediate elongated portion 8 and an enlarged terminal member or portion 9 which is preferably tapered for snug engagement with the connector 4 of the cable connection. The described portions of the extension member 5 are preferably integrally constructed to form a unitary member and the said member preferably consists of an alloy metal containing substantially 2% of antimony and 98% St. Joe pure chemical lead. The above proportions are illustrative of a preferred embodiment of the invention, but it will be understood that these metals may be combined in other proportions without departing from the nature and scope of the improvements.

The extension member 5 is or may be further provided with a central embedded wire or strand 10 of copper or other conducting material to facilitate the unobstructed passage of the current through the arm between the battery and the cable conductor 3. An outer covering or sleeve 11 of rubber or other insulating material is or may be provided on the elongated portion 8 of the arm for protective purposes and to more effectually guard against accidental short circuits, both in handling the extension and which might occur from the accidental presence of tools or articles having current conducting properties.

In the preferred manner of practicing the invention, the hub portion 6 of the arm is burnt or fused at its top to the battery post to provide a semi-permanent engagement to insure against leakage of the current. The burnt or fused area of the parts is indicated for example at 12 (Fig. 2) and may be obtained by the usual gasoline or oxy-acetylene torch. The opposite end of the extension arm is securely fastened to the cable 3 by the usual socket or other connection 4 firmly clamped as indicated to the tapered terminal portion 9 of the arm.

The nature of the alloy constituting the extension arm or member is such that the latter renders the same quite flexible and ductile to permit the arm to be bent or distorted in any desired manner to facilitate its connection or detachment to the cable 3. For convenience in illustration the member has been shown as substantially straight and in its preferred construction should have a minimum length of at least six inches.

The alloy of pure chemical lead and antimony of which the arm is constructed, is highly resistant to corrosion and the deposit of sulphates resulting from acid vapors emanating from the battery in the vicinity of the terminal post 2. These vapors are particularly manifest when the battery is warm or unduly heated from use and due to the nature of the material constituting the extension member, do not form any deposits or have any corrosive effects at the battery terminal post connection. It will further be apparent that these acid vapors have little or no effect upon the cable connection at the other end of the arm due to the relatively remote situation of this connection from the battery, and also due to the acid-resisting nature of the portion 9 of the arm.

In Fig. 3 a modified form of connection is shown for removably securing the hub portion 6 of the arm to the battery post. A threaded nut 13 is cast within an enlargement or boss portion 14 of the hub and a bolt or set screw 15 extends through an aperture in the alloy and threadedly engages said nut. By turning the screw its inner end will be caused to tightly engage the post 2 of the battery for the purpose of rigidly securing the parts together, as will be apparent.

In Fig. 5 a still further modified form of attachment is shown. The hub portion 6 of the extension arm is in the form of a split collar for resiliently engaging the post 2 of the battery. The integral extended portions 16 of the collar are apertured to receive a bolt or screw 17 having a nut 18 which may be drawn up to rigidly secure the hub portion 6 to the battery post.

The extension arm 5 being formed of current conducting material serves as a bridge or cushion between the battery cells and the starting motor and remaining elements of the circuit. It carries and absorbs a certain amount of electricity which serves to prevent undue shock on the battery when the starter button is first depressed, for example in starting heavy automobile motors in cold weather. This cushioning effect also favorably reacts toward the preservation of the ignition, starting motor and other factors in the circuit. The alloy of which the arm is constructed is not easily heated and this fact is instrumental in reducing the temperature adjacent the battery thereby retarding the formation of acid vapors, the latter being ordinarily responsive to warm temperatures. The extension arm is firmly fixed to the battery terminal and forms a bridge between said terminal and the cable connection. In this manner the arm acts as a physical shock absorber in preventing or retarding any tendency of the battery connection becoming loose in road service which would otherwise result in swaying and vibration of the battery plates. In this manner the extension further serves to prolong the life and strength of the battery.

The invention further contemplates the extension arm 5 being formed integrally with the battery post or terminal 2, instead of as a separate member attachable to said post. For this purpose the battery post terminal 2 would be prolonged for a substantial extent and at its terminal portion would be secured to the cable conductor 3 at a point remote from the battery, in the same manner as the cable 3 is attached to the end 9 of the arm. When the arm is formed as described as an integral part of the post 2, it will be understood that corrosion is prevented by reason of the space provided between the connection to the cable terminal and the battery. The usual lead construction of the battery post may be employed for this prolongation, or the same may be constructed of an acid resisting metallic alloy, for instance an alloy of lead and antimony as herein described. In either event the prolongation or extension of the battery post terminal would be sufficiently flexible and ductile by reason of the substance of which it is constructed, to permit convenient attachment of the same to the end of the cable or other electrical conductor 3.

What is claimed is:—

1. An extension for a storage battery terminal comprising: an elongated deformable member of corrosion resisting alloy consisting of lead and antimony, said member having means at one end thereof for engagement with a terminal of said battery and means at the other end thereof for engagement with an electric conductor of corrodible material; and a core of relatively high current conducting material extending longitudinally through said member, whereby said corrodible conductor is electrically connected to said terminal at a point remote from the corrosive acid fumes emanating from said battery, and the deformability of said member adapting it for attachment to said conductor at various locations relative to said terminal.

2. An extension arm and cable support for a storage battery terminal, comprising an elongated self-supporting member of corrosion resisting alloy, said member having a collar at one end thereof for engagement with a terminal of said battery and having means at its other end for connection with a battery cable connector, and said member being also deformable transversely of its length to effect a connection with said cable connector at selected points spaced a substantial distance from said battery, and from the acid fumes emanating therefrom.

In testimony whereof I affix my signature.
CHARLES FREDRICK BINDER.